United States Patent Office 3,365,904
Patented Jan. 30, 1968

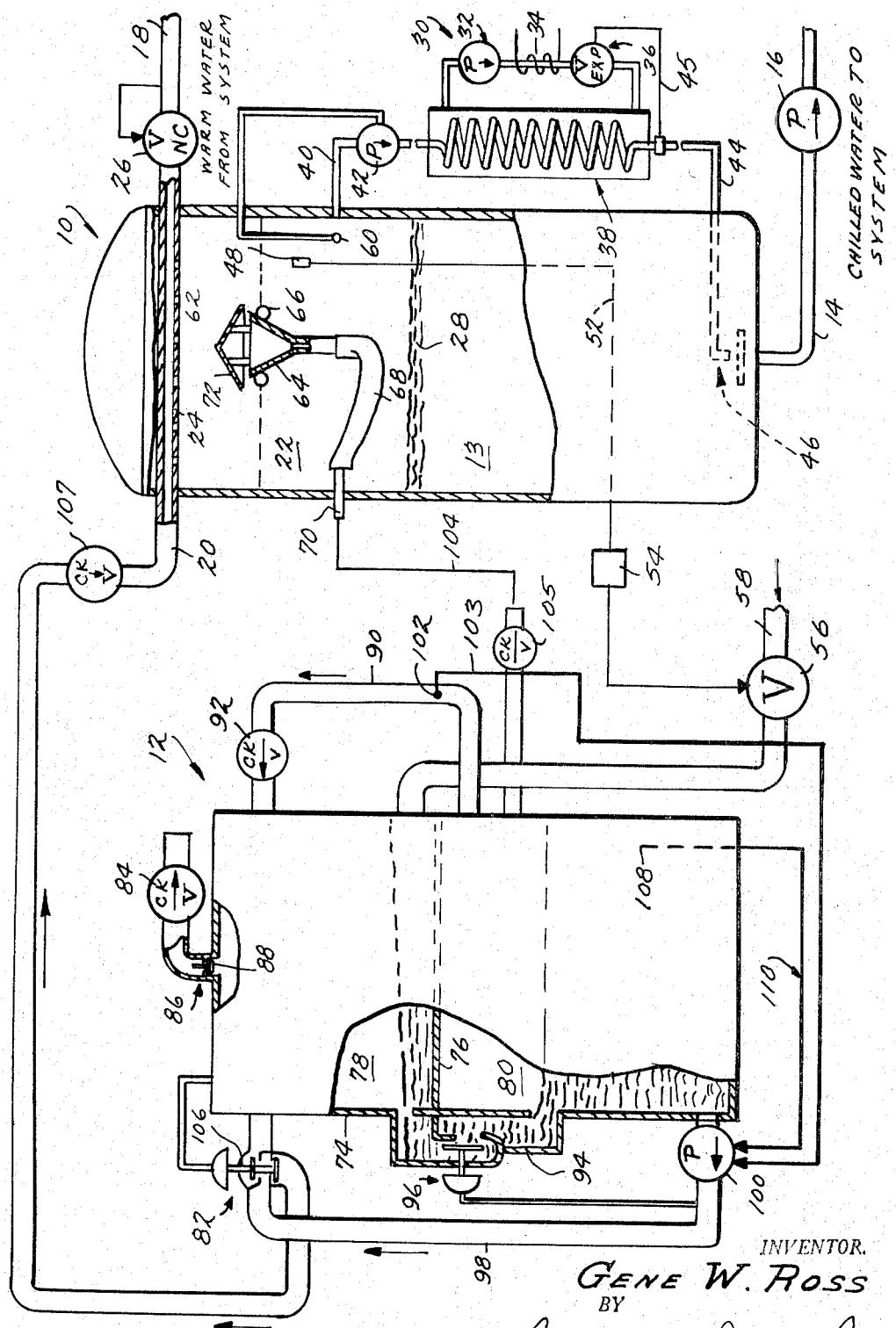

3,365,904
CHILLED WATER ACCUMULATOR WITH
VACUUM DEAERATION
Gene W. Ross, Lorain, Ohio, assignor, by mesne assignments, to Ritter Pfaudler Corporation, Rochester, N.Y., a corporation of New York
Filed Nov. 28, 1966, Ser. No. 597,387
6 Claims. (Cl. 62—177)

ABSTRACT OF THE DISCLOSURE

This invention relates to improved and efficient apparatus for chilling and storing liquid at a fixed rate for subsequent use at variable rates by another system. The apparatus includes a chilling system and a storage accumulator, the latter serving as a variable reservoir for a body of unchilled liquid and a body of chilled liquid in contact with each other. In the preferred construction the storage accumulator is provided with gas skimming means for removing accumulated gas from the surface of the liquid.

Disclosure

Systems which employ large quantities of chilled water, such as process chilling systems for industry, often have recurring periods of peak operation. In order to avoid the expense of a large refrigerating unit which has sufficient cooling capacity to produce chilled water at the peak rate it is conventional to employ a chilled water accumulator or storage tank which stores chilled water for use during peak loads. With this arrangement a relatively small refrigerating unit can be employed, because the additional quantity of chilled water required during peak loads can be withdrawn from the storage accumulator rather than directly from the refrigerating unit. During periods of normal load the refrigerating unit supplies sufficient chilled water to build up a reserve in the accumulator tank. The size of the accumulator tank and the cooling capacity of the refrigerating unit depend, of course, on the cooling requirements of the particular system.

It is one object of the present invention to provide compact economical apparatus for chilling and storing liquid such as water for subsequent use. The apparatus includes a tank or tanks which retains distinct upper and lower layers of warm and chilled liquid in contact with each other at a rather well-defined interface without any appreciable mixing. A relatively small fixed rate of liquid is withdrawn from the warm layer, chilled by a suitable refrigerating unit and conveyed to the chilled liquid layer in the tank. Chilled liquid for the system being supplied by the apparatus is withdrawn as required from the bottom of the tank. The tank and refrigerating unit are sized so that during normal load the volume of chilled liquid in the tank gradually increases with the result that the interface rises. During peak load the accumulated chilled liquid will be sufficient in amount to supply the system even though the refrigerating unit produces chilled liquid at a lower rate than it is being used. The tank is preferably maintained nearly full by introducing warm liquid at the top as needed.

It is a further object of the present invention to provide compact liquid chilling apparatus as described immediately above having means for eliminating corrosive dissolved gases from the liquid, particularly heavy gases such as oxygen carbon dioxide. In the case of water it has been observed that, even if the warm water is deaerated prior to entering the tank, some gas will accumulate in the tank as a result of leaks or incomplete deaeration. More important, however, is the fact that over a period of time a layer of heavy gas collects above the water surface and that in time the layer of gas develops a much higher proportion of carbon dioxide than is found in air.

This occurrence is highly undesirable, because the carbon dioxide tends to redissolve in the water and render the latter corrosive due to lowering of the pH. Since the carbon dioxide content of the heavy gas layer may be greater than its content in air, the redissolution may even put more carbon dioxide into solution than would be present if the water had not been deaerated initially. The present invention prevents the accumulation of heavy gases in the tank by sweeping gas from the surface of the water with a gas skimming device which automatically adjusts its position so as to remain always just above the water surface. In the preferred construction a vacuum deaerator which may be of known construction is employed in combination with the tank in a manner to deaerate the water before it enters the tank, to subject the stored water to a further deaerating vacuum and to draw heavy gas into the skimming device.

The invention will be further understood from the drawing which is an elevational view, partly broken away, of apparatus including a receiving and storage accumulator embodying the principles of the present invention.

The apparatus illustrated in the drawing is intended for use in combination with any system which requires a variable supply of chilled water. The system, which is not shown, may be, for example, an air conditioning system for an office building. An installation of this kind will inherently be subjected to a cyclical load due to the greater cooling required during working hours and sun load periods. According to one feature of the invention the water chilling and storing apparatus shown in the drawing is adapted to employ a tank of tanks to supply, at regular intervals, a relatively large flow of chilled water even though the refrigerating capacity of the apparatus is less than that required to chill the stream of water being drawn from the apparatus. While an air conditioning system is referred to hereinafter, it will be understood that the invention is not restricted to the field of air conditioning.

As shown, the apparatus includes a single tank 10 which serves as a variable reservoir for both warm (unchilled) water and chilled water. A vacuum deaerator 12 is associated with the tank 10 for deaerating makeup water and for sweeping gas from the tank 10. Chilled water is retained as a relatively quiescent body 13 in the lower part of the tank 10 and is made available to the air conditioning system through a chilled water outlet conduit 14 and a pump 16. Warm water, received either by way of a pipe 18 from the air conditioning system or by way of a makeup water pipe 20, is retained as a relatively quiescent body 22 in the upper part of the tank 10 and in contact with the body 13 of chilled water. In the illustrated embodiment both pipes 18 and 20 connect with a spray header 24 which is carried inside the tank 10. A normally closed, pressure responsive valve 26 in the pipe 18 opens when the pressure of the warm water in the air conditioning system exceeds the setting of the valve 26. The function of the valve 26 is to isolate the tank 10 during periods of no flow from the system.

Very little mixing of the two bodies of water occurs because of the difference in density between the heavier chilled water and the lighter warmer water, so that there is a well defined boundary zone illustrated at 28. During operation, the amount of chilled water in the tank 10 will alternatively increase and decrease with the result that the boundary zone 28 will rise and fall thereby permitting the tank 10 to operate as a variable capacity reservoir for both warm and chilled water.

A refrigerating unit 30, which may be of any conventional type, is included as part of the apparatus in order to supply the chilled water which is ultimately sent to the air conditioning system through the pipe 14. As previously explained, the cooling capacity of the unit 30 is less than that required to chill the water passing to the system at peak load but is great enough to chill the total water flow to the system over a longer period of time. As shown, the unit 30 is illustrated schematically as being of the closed-circuit expansion type including a refrigerant compressor 32, a condenser 34, an expansion valve 36 and an evaporator 38, the latter being a heat exchanger in which heat is absorbed by vaporization of the refrigerant. The unit 30 may be located remote from or adjacent the tank 10. In some cases the evaporator 38 may be disposed within the tank 10. In any event warm water from the body 22 of warm water in the tank 10 is conveyed to the evaporator 38 of the refrigerating unit 30, as by means of a pipe 40 and a circulating pump 42 and thence to the body 13 of chilled water in the tank 10, as by means of a pipe 44. Preferably, there is included a diffusing means 46 providing for a nonturbulent, horizontal laminar flow of water from the pipe 44 into the bottom of the tank 10. Control of the unit 30 may be obtained with an aquastat circuit 45 which senses the temperature of the water in the pipe 44. In operation, the circulating pump 42 and the refrigerating unit 30 cooperate to inject a constant flow of constant temperature chilled water, e.g. 40° F., into the lower part of the tank 10.

Automatic liquid level control of the tank 10 may be obtained by adding warm water, if needed, to maintain the desired water level in the tank 10. In the illustrated embodiment control is obtained with the use of a liquid level probe 48 which may be of a conventional type. The probe is arranged in the upper part of the tank 10 at a location corresponding to the desired minimum water level and is connected by suitable electric lead 52 with a control circuit 54. The latter may be employed in any suitable way to open valves or operate pumps so as to introduce warm water into the upper part of the tank 10 when the water level falls to the location of probe 48. The control circuit 54 may control the flow of warm water out of the air conditioning system and, as shown, it will control the flow of warm makeup water, when needed. In the illustrated embodiment the circuit 54 operates a valve 56 in a water supply conduit 58 which delivers makeup water to the deaerator 12 which will then deliver a like quantity of deaerated water to tank 10.

Additional control is obtained by shutting down the chilling operation when a desired amount of chilled water has accumulated in the tank 10. As shown, the pump 42 is provided with a temperature responsive control, including a temperature sensitive element 60 disposed within the tank 10 to sense the arrival of the level of chilled water 13 at the location of the conduit 40.

A second feature of the invention relates to the elimination of dissolved gas in the chilled water passing to the air conditioning system. As described previously, it has been found that during prolonged operation an oxygen and carbon dioxide rich layer of gas tends to build up above the water surface in the tank 10 even though the warm water entering the tank 10 has been subjected to any of the conventional deaerating operations. According to the principles of the present invention there is provided a gas skimming device 62 which sweeps away gas from the surface of the water 13. The preferred construction of the apparatus includes the vacuum deaerator 12, because the vacuum produced in the latter may be employed by the gas skimmer 62 to sweep gas out of the tank 10. Broadly, the gas skimmer 62 includes a conduit having one open end which is disposed immediately above the water surface regardless of the level of the surface and an opposite end connected to the deaerator 12 in a manner to receive vacuum from the latter.

In the illustrated embodiment the skimmer 62 includes a funnel-like member 64 carried at the water surface by means of a float 66 and a flexible conduit 68 connecting the lower end of the funnel-like member to a fixed fitting 70 which passes to the outside of the tank 10. The upper end of the funnel-like member 64 rides just above the water surface and is provided with a cap 72 which prevents water from the spray header 24 from entering the member 64. It will be understood that the configuration of the member 64 is merely exemplary of a fitting which has been found appropriate for drawing gas from the water surface. In large tanks, of course, it may be desirable to employ more than one skimmer.

The vacuum deaerator 12 preferably is of the known type which operates by placing a charge of water in a tank, sealing the tank and then pumping a portion of the water from the sealed tank. The latter operation creates a vacuum in the tank which equals or approaches the vapor pressure of the water. Under this boiling point condition all or substantially all dissolved gases come out of solution and rise to the surface of the now-deaerated water in the form of small bubbles. The operation is a cyclical one in that, after some or all of the deaerated water has been pumped from the tank, a new charge of undeaerated water is introduced so as to displace the liberated gases through a vent provided for the purpose. The deaerator 12 which is illustrated is constructed in accordance with the disclosure of U.S. patent to Baker No. 3,104,163. Accordingly, a brief description of the deaerator 12 will suffice for the purposes of the present invention. It will be understood from the above that the precise manner in which a vacuum is produced is not significant to the present invention.

The deaerator 12 is constructed in the form of a single hollow shell 74 which is divided by a transverse wall 76 into an upper receiving chamber 78 and a lower deaerating chamber 80 of somewhat smaller size. The raw water supply pipe 58 connects with the receiving chamber 78, and the deaerated water pipe 20 connects with a pressure-responsive, two-way valve 82 which is associated with both chambers. The upper end of the receiving chamber 78 is provided with a vent arrangement which permits gas to be vented while preventing escape of liquid. The arrangement includes a conventional check valve 84 which is connected to pass gas only in a direction out of the chamber 78. Downstream of the check valve 84 is a valve 86 which is closed automatically by the energy imparted to a movable closure member 88 by rising liquid. The two chambers 78 and 80 are interconnected by a first conduit 90 containing a check valve 92, a second conduit 94 containing a pressure responsive valve 96, and a third conduit 98 containing the pressure-responsive, two-way valve 82 and a pump 100.

The following sequence occurs when the deaerator 12 operates, assuming that initially the valve 96 is open and the pump 100 is not running. Undeaerated water enters the receiving chamber 78 through the pipe 58 and flows by gravity through the conduit 94 into the deaerating chamber 80. When the level of water rises to a predetermined height, as established for example by a conventional liquid level probe 102 and electrical lead 103, the pump 100 is started. Pressure at the outlet of the pump 100 causes the pressure-responsive valve 96 to close with the result that the deaerating chamber 80 becomes sealed. Continued operation of the pump 100 rapidly creates a boiling point vacuum in the deaerating chamber 80, and this causes dissolved gas to come out of solution and to collect in the upper part of the chamber 80. Simultaneously, the vacuum is applied through a line 104 and check valve 105 to the gas skimmer 62.

The two-way valve 82 includes a movable valve element 106 having an up position for directing water from the conduit 98 into the receiving chamber 78 and a down position for directing water from the conduit 98 into the conduit 20. The valve element 106, which is shown in an intermediate position for ease of illustration, is normally up so that water being pumped out of the deaerating chamber 80 passes into the receiving chamber 78. As the water level rises any overlying gas is forced out through the valve 86 and the check valve 84. When the rising water contacts the valve element 88, the latter moves to a closed position, and the pressure in the chamber 78 begins to increase. This increase is transmitted to the valve 82 to move the valve element 106 to its down position. When this occurs, fully deaerated water is pumped from the conduit 98 into the conduit 20. The latter contains a check valve 107 to prevent flow in the reverse direction.

When the level of water in the deaerating chamber 80 has been pumped down to a predetermined low level, illustrated by a liquid level probe 108 and associated electrical lead 110, the pump 100 is stopped. This causes the pressure in the conduit 98 and in the receiving chamber 78 to drop with the result that the valve 96 opens and the valve member 106 of the two-way valve 82 moves to its up position. The partially deaerated water in the receiving chamber 78 flows by gravity through the conduit 94 into the deaerating chamber 80. The gas in the upper part of the deaerating chamber 80 is displaced upwardly through the conduit 90 into the receiving chamber 78. Since the deaerating chamber 80 is larger than the receiving chamber, the water will not rise to the level of the upper control probe 102. However, if the water level in the chilling and storage tank 10 drops to the level of the probe 48, the valve 56 will open and permit water to fill the deaerating chamber 80. A suitable interlock circuit (not shown) is provided to prevent undeaerated water from passing from the conduit 58 directly through the receiving chamber 78 into the conduit 20.

It will be apparent from the above description that the water in the chilling and storage tank 10 is periodically subjected to a deaerating vacuum and that the vacuum, in being applied just above the water surface, will skim off the lowest layer of gas. These two effects cooperate to pull any remaining dissolved gas or redissolved gas out of the water and to prevent a layer of heavy gas from accumulating in the tank 10. The vacuum could, in principle, be obtained from a source other than a vacuum deaerator. However, the latter is much preferred inasmuch as the vacuum produced thereby is in the nature of a by-product and, in addition, may be employed simply by means of the connection constituted by the line 104 and check valve 105.

The operation of the chilling and storage tank 10 has been described in connection with the various parts and may be summarized as follows. During operation of the air conditioning system at normal load the constant flow rate of chilled water from the refrigerator unit 30 exceeds the rate at which chilled water is being withdrawn from the tank 10 through the pipe 14. The body 13 of chilled water therefore increases in volume while the volume of the body 22 of unchilled water decreases. The interface zone 28 rises, but no appreciable mixing of chilled and unchilled water occurs, because the bodies 13 and 22 are quiescent. The water which is sent to the system is periodically replaced either from the system through the pipe 18 or from the deaerator through the pipe 20. The liquid level probe 48 and the control circuit associated therewith maintain the minimum water level for efficient operation. If the top of the body 13 of chilled water rises to the temperature sensor 60 the recirculating pump stops so that no additional water is chilled.

When the air conditioner load peaks, chilled water will be withdrawn through the pipe 14 at a greater rate than it can be supplied by the refrigerating unit 30, and the body 13 of chilled water decreases in volume. The size of the tank 10 and the capacity of the unit 30 will have been related by prior calculation so that the body 13 of water will supply the needs of the air conditioning system during this peak period. When the load diminishes, the refrigerating unit 30 will again build up a large volume of chilled water.

The space above the body 13 of the unchilled water remains under a vacuum which is periodically renewed by operation of the deaerator 12. Water passing through the header 24 is sprayed into this vacuum space and thereby presents a large surface area from which dissolved gases may escape. The deaerating effect of the vacuum and the gas sweeping function of the skimmer 62 have been described previously.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. Apparatus for chilling water and for suppling chilled water to a system employing the same variously at normal rate and at peak load rate, said apparatus comprising a vertically elongated tank for storing a relatively quiescent mass of chilled water below and in contact with a relatively quiescent mass of warm water; a warm water inlet communicating with the upper portion of said tank for delivering warm water to said tank; a chilled water outlet communicating with the lower portion of said tank; means including a conduit for conducting chilled water from said outlet to the system in accordance with the demands of the system; and means for maintaining in said tank a volume of chilled water in excess of that required to supply the normal rate required by the system so that said tank serves as an accumulator for chilled water, said means including a refrigerator circuit having a heat exchanger for transferring heat from a fluid stream to a refrigerant stream, a warm water conduit communicating with the upper part of said tank and with said heat exchanger, a chilled water conduit communicating with said heat exchanger and with the lower part of said tank and a pump for passing a stream of water from the upper part of said tank through said warm water conduit, said heat exchanger and said chilled water conduit into the lower part of said tank at a rate in excess of said normal rate employed by the system whereby during said normal rate the amount of chilled water in said tank increases.

2. Apparatus as in claim 1 liquid level responsive means for controlling the flow of warm water into said warm water inlet of said tank, said means including upper and lower liquid level sonsors associated with said tank above the inlet end of said warm water conduit.

3. Apparatus as in claim 1 in combination with a vacuum deaerator for delivering deaerated warm water to said tank, said vacuum deaerator including deaerator tank means, means for intermittently sealing and venting said deaerator tank means, warm water inlet means associated with said deaerator tank means, a pump having an inlet connected to said deaerator tank means below the water level therein for pumping water out of said deaerator tank means when the latter is sealed whereby a deaerating vacuum is produced in said deaerator tank means, said pump having an outlet connected to said warm water inlet of said chilled water tank;

and means for periodically removing gases from said chilled water tank, said means including a gas skimming conduit disposed in said chilled water tank and having an open end arranged above the water surface therein, an external conduit connecting the other end of said gas skimming conduit to said deaerator tank means and one-way valve means associated with said external conduit for permitting fluid flow only out of said chilled water tank whereby the periodic vacuum in said deaerator tank means removes accumulated gases from said chilled water tank through said skimming conduit and said external conduit.

4. Apparatus as in claim 3 including liquid-level responsive means in said chilled water tank and connected to said gas skimming conduit for supporting the open end of said gas skimming conduit slightly above the water surface.

5. Apparatus for receiving warm water, chilling the same and storing the chilled water for use by a remote system, said apparatus comprising a vertically elongated tank for retaining a relatively quiescent body of chilled water in its lower portion and below and in contact with a relatively quiescent body of warm water; a warm water inlet communicating with the upper part of said tank; a chilled water outlet communicating with the lower part of said tank;

means for maintaining a substantial amount of chilled water in said tank, said means including a refrigerator circuit external to said tank, said refrigerator circuit having a heat exchanger for transferring heat from a fluid stream to a refrigerant stream, a warm water conduit communicating with the upper part of said tank and with said heat exchanger, a chilled water conduit communicating with said heat exchanger and with the lower part of said tank and a pump for passing a stream of water from the upper part of said tank through said warm water conduit, said heat exchanger and said chilled water conduit into the lower part of said tank whereby the amount of chilled water in said tank relative to the amount of warm water in said tank increases when the capacity of said pump exceeds the rate of withdrawal of chilled water through said chilled water outlet;

and control means for said apparatus, said control means including liquid level responsive means for introducing warm water through said warm water inlet to maintain the water level in said tank between predetermined upper and lower levels, said control means further comprising means for turning off said pump when the amount of chilled water in said tank increases to a predetermined volume and for turning on said pump when the amount of chilled water in said tank falls below a predetermined volume.

6. Apparatus as in claim 5 including a gas skimming device for removing gas from the surface of the water in said tank, said device comprising a float and a conduit, said conduit having a flexible portion and an open end supported by said float immediately above the water surface and an opposite end disposed outside said tank.

References Cited
UNITED STATES PATENTS 2,299,414    10/1942    Spiegl    62—177 X
3,247,678    4/1966    Mohlman    62—185
3,257,818    6/1966    Papapanu    62—185

LLYOD L. KING, *Primary Examiner.*